H. F. PORTER.
VEHICLE-WHEEL.

No. 175,748. Patented April 4. 1876.

WITNESSES:

INVENTOR.
Henry F. Porter
by Geo. W. Dyer
ATTORNEYS.

UNITED STATES PATENT OFFICE.

HENRY F. PORTER, OF SOUTH BEND, INDIANA.

IMPROVEMENT IN VEHICLE-WHEELS.

Specification forming part of Letters Patent No. 175,748, dated April 4, 1876; application filed December 16, 1875.

*To all whom it may concern:*

Be it known that I, HENRY F. PORTER, of South Bend, in the county of St. Joseph and State of Indiana, have invented a new and useful Improvement in Carriage-Wheels; and I do hereby declare that the following is a full and exact description of the same, reference being had to the accompanying drawings, and to the letters of reference marked thereon.

My invention is an improvement in carriage-wheels; and consists, mainly, in constructing the tire with a flat tread and equal in width with the thickness of the felly, the inner surface of the tire being parallel to the tread, and of the same width, and with both edges regularly outwardly curved; and its object is to project the rounded portion of the tire beyond the felly in such manner that the felly and the paint upon the same are protected, the wear-iron on the carriage-body preserved from destruction or disfigurement, and the tire, by such construction, prevented from throwing mud or other matter when the carriage upon which it is placed is rapidly driven.

The wheel thus constructed serves the above-named purposes wherever it may be used; but the special object for which the particular construction is devised is for use in carriages intended to be employed in cities where there are rail-tracks laid in the streets, which speedily destroy the ordinary wheels of carriages getting between the same, or out from between the same, and where the curbs in paved streets, and some sorts of pavements, are destructive to carriage-wheels.

To enable others skilled in the art to make and to manufacture my tire, I now describe the same in connection with the drawings, in which—

Figure 1:
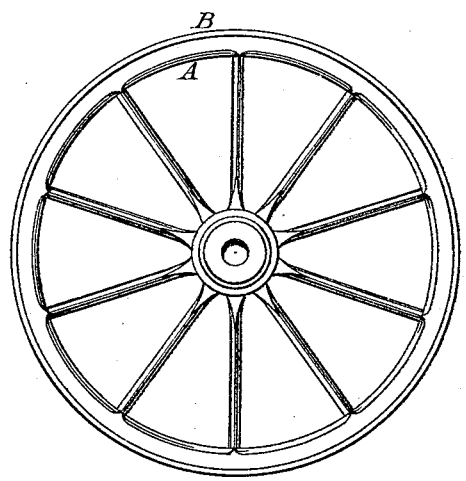
Figure 2:
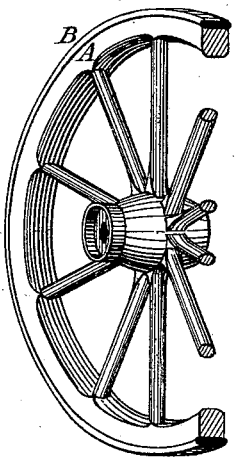
Figure 3:
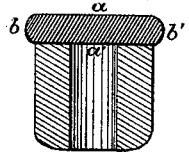

Figure 1 is a side elevation of the carriage-wheel. Fig. 2 is a perspective sectional view of the same; and Fig. 3 is an enlarged transverse section of the tire and felly.

Like letters denote corresponding parts in each figure.

A represents the felly of a carriage-wheel of ordinary construction, and B the improved tire.

This tire is adapted to be placed upon the wheel by the ordinary process of shrinkage, and has a flat tread-surface, $a$, and its inner surface $a'$ parallel to such tread, and of equal width. The edges $b$ $b'$ of the tire are formed on arcs of circles, whose centers are on a straight line running transversely through the center of the tire, the two surfaces $a$ $a'$ being of the same width as the thickness of the outer edge of the felly.

The tire is shrunk onto the felly A in any usual or common manner, and projecting beyond the sides of the felly, as described, forms a bead between the tread-surface and the felly.

The advantages of my tire are as follows: The tire is one which can be applied to the wheel by the ordinary process of shrinkage. The projecting sides of the tire protect the felly itself, and the paint upon it, from wear or injury. The bead-finish between the tread and felly, by its projection laterally, prevents the wheel in use from throwing mud, dirt, and water, as the same will not cling to the circular surface, as is the case in tires having an angular edge at the sides of the tread-surface. The wear-iron on the carriage is also preserved from defacement or destruction by the bead-finish, as there is no sharp angle or edge of the tire to cut into and destroy the wear-iron. The bead-edge spoken of is also free from the tendency of the ordinary angle or edge of the tire to catch into the wear-iron, and there cramp and overturn the carriage, because its form presents so little friction against such wear-iron.

In addition to the advantages above named, it will be found that, for use in cities, the form of the tire will permit the carriage-wheels to be tracked into or out of railroad-tracks without the wrenching, torsion, and destruction of the wheels as usually made, and without the usual destruction of the paint upon the fellies and the fellies themselves. The same beneficial result follows when the wheels are forced or driven up against the curbs, and even in passing over cobble-stone or other rough-stone pavements.

I am aware of the invention for which Letters Patent issued December 15, 1874, to F. Corsa, and disclaim the same, since it is an essential feature of my tire that it should have a flat tread equal in width to the thickness of the felly and parallel to the inner face of the tire.

Having thus described my carriage-wheel and some of its advantages, what I claim as new therein and my invention, for which I desire Letters Patent, is—

The carriage-wheel tire A, with a flat tread, and flat under side of equal width, and with rounded edges, substantially as and for the purposes set forth.

This specification signed and witnessed this 9th day of December, 1875.

HENRY F. PORTER.

Witnesses:
  JOHN W. ANDERSON,
  LEWIS Z. DODDS.